(12) United States Patent
Neary et al.

(10) Patent No.: US 9,104,461 B2
(45) Date of Patent: Aug. 11, 2015

(54) HYPERVISOR-BASED MANAGEMENT AND MIGRATION OF SERVICES EXECUTING WITHIN VIRTUAL ENVIRONMENTS BASED ON SERVICE DEPENDENCIES AND HARDWARE REQUIREMENTS

(75) Inventors: Paul Peter Neary, Greystones (IE); Thomas Bernard Shaw, Dublin (IR)

(73) Assignee: Oracle International Corporation, Redwood Shores, CA (US)

( * ) Notice: Subject to any disclaimer, the term of this patent is extended or adjusted under 35 U.S.C. 154(b) by 445 days.

(21) Appl. No.: 13/524,062

(22) Filed: Jun. 15, 2012

(65) Prior Publication Data

US 2013/0339947 A1     Dec. 19, 2013

(51) Int. Cl.
| | |
|---|---|
| *G06F 9/455* | (2006.01) |
| *G06F 9/50* | (2006.01) |
| *G06F 9/44* | (2006.01) |
| *G06F 9/445* | (2006.01) |
| *G06F 9/48* | (2006.01) |

(52) U.S. Cl.
CPC .............. *G06F 9/45558* (2013.01); *G06F 8/60* (2013.01); *G06F 9/44* (2013.01); *G06F 9/455* (2013.01); *G06F 9/4856* (2013.01); *G06F 9/50* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 8,316,125 | B2 * | 11/2012 | DeHaan | 709/224 |
| 8,589,557 | B1 * | 11/2013 | Labat et al. | 709/226 |
| 2010/0125477 | A1 * | 5/2010 | Mousseau et al. | 705/7 |
| 2010/0125665 | A1 * | 5/2010 | Simpson et al. | 709/224 |
| 2010/0125844 | A1 * | 5/2010 | Mousseau et al. | 718/1 |
| 2010/0250744 | A1 * | 9/2010 | Hadad et al. | 709/226 |
| 2011/0209145 | A1 * | 8/2011 | Chen et al. | 718/1 |
| 2012/0005346 | A1 * | 1/2012 | Burckart et al. | 709/226 |
| 2012/0222037 | A1 * | 8/2012 | Labat et al. | 718/104 |
| 2012/0266168 | A1 * | 10/2012 | Spivak et al. | 718/1 |
| 2013/0239109 | A1 * | 9/2013 | Ferwerda et al. | 718/1 |

* cited by examiner

*Primary Examiner* — Emerson Puente
*Assistant Examiner* — Benjamin Wu
(74) *Attorney, Agent, or Firm* — Osha Liang LLP

(57) ABSTRACT

A system for migrating services including a primary virtual environment (VE) with a service manager and a VE manager, and a secondary VE, where both VEs execute a plurality of services, a set of physical hardware, and a hypervisor including a service module for storing extended service attributes for each service. The hypervisor manages migration one of the plurality of services executing on a source VE, obtain hardware requirements of the source VE, obtain extended service attributes associated with the one of the plurality of services to be migrated, and select a target VE for migration of the service. The target VE is selected based on the source VE data and the extended service attributes of the one service. The hypervisor migrates the one service by configuring the target VE and installing the service on the target VE using install scripts that execute on the target VE.

19 Claims, 5 Drawing Sheets

HYPERVISOR-BASED MANAGEMENT AND MIGRATION OF SERVICES EXECUTING WITHIN VIRTUAL ENVIRONMENTS BASED ON SERVICE DEPENDENCIES AND HARDWARE REQUIREMENTS

BACKGROUND

Hardware virtualization allows for the maximum utilization of hardware by providing one or more virtual environments (VEs) within the same physical system (i.e., using the same amount of physical hardware). Migration of software services among the various virtualized environments executing on the same physical hardware requires the same process currently used for migrating services between distinct physical systems. Such migration of services are largely manual processes that are error prone and require downtime of the services being migrated.

SUMMARY

In general, in one embodiment, the invention relates to a system for migrating services, comprising an execution environment with a primary virtual environment (VE) executing a primary operating system and comprising a service manager and a VE manager, and a first secondary VE executing a guest operating system, wherein a plurality of services execute on each of the primary VE and the first secondary VE, and a set of physical hardware, wherein the primary VE and the first secondary VE execute on the set of physical hardware, wherein the execution environment comprises a hypervisor operatively connected to the physical hardware devices, the hypervisor comprising a service module for storing a plurality of service profiles comprising extended service attributes of each of the plurality of services executing in the primary VE and the first secondary VE, the hypervisor being configured to receive a request to migrate one of the plurality of services executing on a source VE, wherein the source VE is the first secondary VE, obtain source VE data by querying the service manager, wherein source VE data comprises hardware requirements of the source VE, obtain extended service attributes associated with the one service to be migrated, select a target VE for migration of the service, wherein the target VE is selected based on the source VE data and the extended service attributes of the one service, wherein the target VE conforms to the requirements of the one service to be migrated, and migrate the one service using a dynamic automated process comprising configuring the target VE and installing the service on the target VE using a plurality of install scripts that execute on the target VE.

In general, in one aspect, the invention relates to a method for migrating a service by a hypervisor, comprising receiving a request to migrate one of a plurality of services executing on an execution environment operating system (OS), wherein the execution environment executes a primary VE and a first secondary VE and wherein the source VE is the first secondary VE, obtaining source VE data by querying the service manager, wherein source VE data comprises hardware requirements of the source VE, obtaining extended service attributes associated with the one service to be migrated, selecting, by the hypervisor, a target VE for migration of the service, wherein the target VE is selected based on the source VE data and the extended service attributes of the one service, wherein the target VE conforms to the requirements of the one service to be migrated, and migrating, by the hypervisor, the one service using a dynamic automated process comprising configuring the target VE and installing the service on the target VE using a plurality of install scripts that execute on the target VE.

In general, in one aspect, the invention relates to A non-transitory computer readable medium comprising software instructions, that when executed, are configured to perform a method for migrating a service, the method comprising receiving a request to migrate one of a plurality of services executing on a execution environment operating system (OS), wherein the execution environment executes a primary VE and a first secondary VE and wherein the source VE is the first secondary VE, obtaining source VE data by querying the service manager, wherein source VE data comprises hardware requirements of the source VE, obtaining extended service attributes associated with the one service to be migrated, selecting, by the hypervisor, a target VE for migration of the service, wherein the target VE is selected based on the source VE data and the extended service attributes of the one service, wherein the target VE conforms to the requirements of the one service to be migrated, and migrating, by the hypervisor, the one service using a dynamic automated process comprising configuring the target VE and installing the service on the target VE using a plurality of install scripts that execute on the target VE.

DETAILED DESCRIPTION

Figure 1:
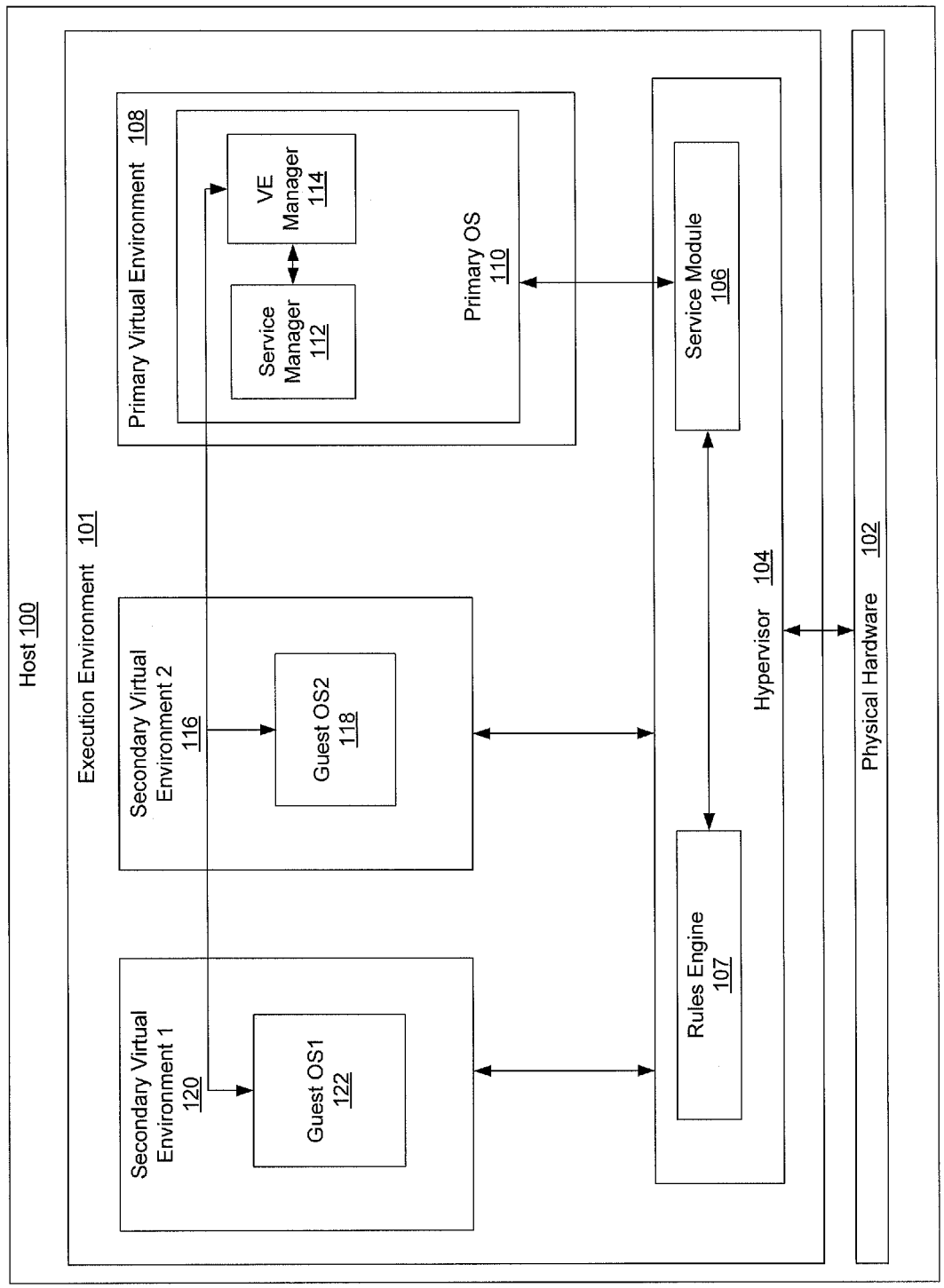
FIG. 1 shows a service migration system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and process for migration of individual services from one virtual environment to another on the same physical system. More specifically, embodiments of the invention are directed to hypervisor-based management of service migration, in which the hypervisor plays the primary role in determining when to migrate services, collecting and storing service migration information, and selecting a target VE that becomes the destination of the service to be migrated.

FIG. 1 shows a system for service migration in accordance with one or more embodiments of the invention. More specifically, FIG. 1 shows a system which includes an execution environment (101) and physical hardware (102). A host (100) is configured to include both the execution environment (101) and physical hardware (102). The execution environment supports the execution of multiple VEs and the hypervisor. Each of the aforementioned components of the system shown in FIG. 1 are described in detail below.

The execution environment (101) may be configured to execute multiple virtual environments or virtual machines. For example, the execution environment (101) may support a Solaris™ OS, a Windows® OS, a MAC™ OS, or any other suitable OS. Solaris™ is a trademark of Oracle America, Inc., Windows® is a registered trademark of Microsoft Corp., and MAC™ is a trademark of Apple, Inc. In one or more embodiments of the invention, the execution environment (101) executes a primary VE (108) and at least one secondary VE (VE 1 (120), VE 2 (116)). A VE is a virtualized execution environment that runs its own operating system (OS) instance. An example of VE is a Solaris™ Container. In such cases, the Solaris™ Container may execute in a primary OS (110), which may be a Solaris™ operating system. Each VE is a distinct operating environment configured to inherit underlying functionality of the execution environment (101) via an abstraction layer. In one or more embodiments of the invention, each VE (108, 116, 120) includes a separate instance of an operating system (e.g., primary OS (110), guest OS1 (122) guest OS2 (118)).

Each VE (108, 116, 120) executes one or more services (not shown). Services may be software programs or applications that provide a set of capabilities to other software executing on the same VE. Services are managed within each VE by a service monitoring process and execute on the OS instance associated with the corresponding VE. Examples of services may include, but are not limited to, electronic mail applications, telephone services, file system services, dynamic IP address assignment, remote login services, database management services, or any other suitable software service that may be provided by a computing device.

In one or more embodiments of the invention, the primary VE (108) in the execution environment (101) is the interface to the hypervisor (104) for the management of services across all VEs. Those of ordinary skill in the art would appreciate that the primary VE (108) communicates with the hypervisor (104) via the primary OS (110). The primary VE (108) includes a service manager (112) and a VE manager (114). The VE manager (114) is operatively connected to each of the guest OSes (118, 122) executing on secondary VEs (116, 120). In one or more embodiments, the VE manager (114) is configured to obtain information about the secondary VEs (116, 120) executing on the execution environment (101). More specifically, the VE manager (114) is configured to collect data on specific requirements of each VE executing in the execution environment. For example, the VE manager may collect data about which OS each VE executes, the amount of memory that each VE utilizes, the CPU power required by each VE, etc.

The service manager (112) is configured to coordinate the management of virtualized services. For this purpose, the service manager (112) is operatively connected to both the hypervisor (104) and the VE manager (114). The service manager (112) executes within the primary OS (110) and is configured to assist in the configuration and management of each virtualized service executing across all the VEs in the execution environment. In one or more embodiments of the invention, each VE may execute a service monitoring process with which services register. The service manager (112) may communicate with the service monitoring process on each secondary VE (116, 120) to obtain basic service information for all the services executing in the execution environment (101). Such basic information may include service name, service status/state, service rank (low, medium, critical), service dependencies, scripts for starting/stopping services, and/or one or more thresholds or triggers that would alert the system to possibly relocate or migrate the service. For example, a trigger may be memory>=90% or CPU>=90% or swap>=95%. The service manager (112) is also configured to store such basic service information gathered from secondary VEs (116, 120) in the primary VE (108).

In one or more embodiments of the invention, to support service installation, relocation, and scalability across VEs, the primary VE (108) may require extended service attributes in the service manager (112). Thus, the service manager (112) within the primary VE (108) may be augmented to include extended service attributes. Types and examples of extended service attributes are discussed further below.

Continuing with FIG. 1, each VE (108, 116, 120) in the execution environment (101) is operatively connected to the hypervisor (104). The hypervisor (104), in turn, is operatively connected to the single set of physical hardware shared by the multiple VEs. Thus, the hypervisor interfaces with both the physical hardware (102) and the VEs. The hypervisor is also known as the virtual machine manager (VMM) and is a hardware virtualization technique/process allowing multiple OS instances (110, 118, 122) to run concurrently in the execution environment (101). The hypervisor presents to the OS instances a virtual operating platform and manages the execution of the OS instances in each VE. In other words, the hypervisor (104) is responsible for abstracting the physical hardware to provide virtualized hardware that is shared among the multiple VEs and OS instances. In one or more embodiments of the invention, the hypervisor (104) includes a service module (106) and a rules engine (107).

In one or more embodiments the service module (106) in the hypervisor (104) is responsible for abstracting the description and dependencies associated with services and capturing/storing information necessary to support a migration process of each service. In one or more embodiments, the service module (106) in the hypervisor is configured to store service profiles with migration information about each service executing across the plurality of VEs. The service profiles (not shown) may be data structures such as lists, tables, arrays, trees, linked-lists, etc, configured to store the migration information captured by the service module.

In one or more embodiments of the invention, the hypervisor (104), with the help of the service module (106), manages service information across/between multiple VEs, including dependencies, states, and rules on when and how to migrate or duplicate services on different VEs. The service module (106) leverages the existing service manager information stored in the primary VE and includes extended service attributes required to manage service migration across/between VEs. This additional service information is solely used by the hypervisor (104) for service migration/relocation between VEs. Such extended service attributes, may include, but are not limited to, OS instances with which each service is compatible, file-system dependencies (e.g., location of log files, data files, binaries, etc.), execution environment attributes (e.g., operating system type), memory footprints, service installation and configuration automation code, migration type (e.g., non-relocatable, relocatable, scalable, failover, etc.), and concurrency (e.g., single instance, multiple instance, thread safe, cluster-filed-system aware, etc.).

Those skilled in the art will appreciate that in an alternative embodiment of the invention, the service manager (112) in the primary VE (112) may store the aforementioned extended service attributes rather than such information being stored in the hypervisor. In this case, extended service attributes may be stored in the service manager (112) of the primary VE (108) and then pulled by the hypervisor (104) or pushed to the hypervisor by the service manager (112) as required during service migration.

Further, the service module (106) is operatively connected to the rules engine (107). In one or more embodiments of the invention, the rules engine (107) is an entity within the hypervisor (104) that is configured to generate and store rules that are executed when a service is migrated. Accordingly, the rules engine (107) may be a repository for rules or a suitable data structure for storing rules associated with services. For example, the rules engine (107) may be configured to store dependency rules associated with each service, which dictate which services are dependent on others or which services are dependent on particular source VE parameters. Other types of rules may be rules which dictate whether particular services must be stopped on the source VE before migration, or whether the particular services can be running in two VEs simultaneously for a predetermined period of time. For example, each service may include a rule that states whether the service is installable, relocatable, or scalable. Rules may also include triggers for each service. In one or more embodiments of the invention, triggers are hardware resource requirement thresholds for each service. Rules generated by or stored in the rules engine (107) may be pre-defined, default rules, or user-defined rules.

Physical hardware (102) virtualized by the hypervisor (104) may include hardware processors (CPUs), physical memory, physical storage devices, I/O devices, servers, or any other suitable hardware device or component that may be utilized by the execution environment (101) to execute VEs, services, applications, etc. Those skilled in the art will appreciate that one or more of the components shown in FIG. 1 may be omitted or combined. For example, the host (100) and the physical hardware (102) may be one and the same. Accordingly, the system for hypervisor-based service management is not limited to the structure of FIG. 1.

Figure 2:
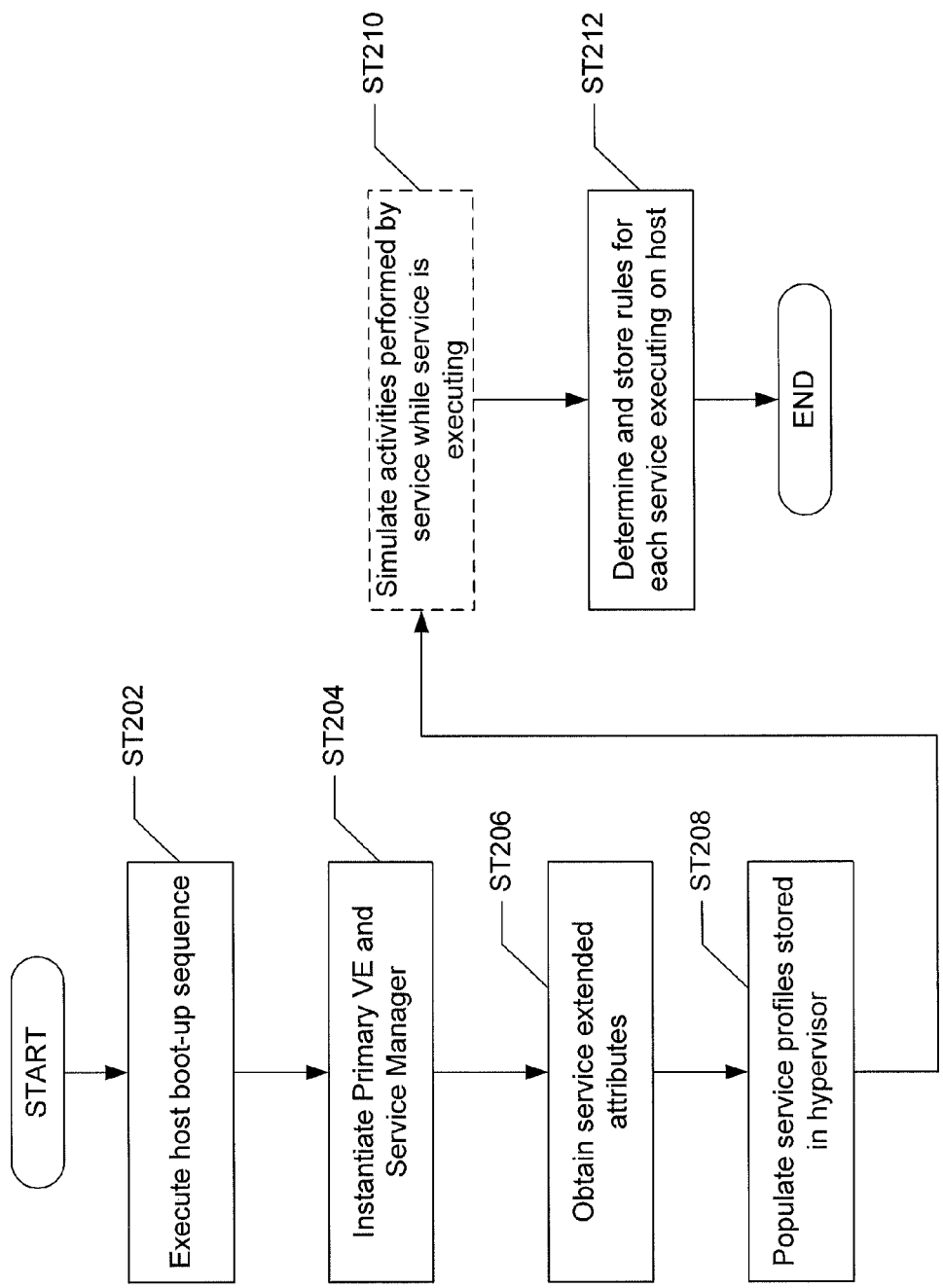
FIGS. 2-4 show flow charts for migrating services in accordance with one or more embodiments of the invention.

FIG. 2 shows a flowchart for collecting information for the hypervisor to manage service migration in accordance with one or more embodiments of the invention. More specifically, FIG. 2 describes a process for collecting service migration information at the hypervisor level. While the various steps in these flowcharts are presented and described sequentially, one of ordinary skill will appreciate that some or all of the steps may be executed in different orders, may be combined or omitted, and some or all of the steps may be executed in parallel.

Initially, a system boot-up sequence is executed (ST 202). The system boot-up sequence includes the normal sequence of activities that occur when the entire system including the physical hardware, the hypervisor, the host OS, and the VEs executing on the host are initially started or restarted. Specifically, the boot-up sequence follows an order in which the physical hardware and hypervisor are initialized first. Then, instantiation of the host OS, and instantiation of the primary VE and an OS instance executing in the primary VE (ST 204). Next, the service manager executing in the primary VE is initialized.

In one or more embodiments of the invention, during the boot-up sequence, the hypervisor is configured to obtain extended service attributes (i.e., service migration information) from the primary VE and the service manager (ST206). More specifically, the hypervisor may be configured to pull extended service attributes from the service manager during boot-up of the system. The hypervisor may do this by querying the service manager in the primary VE. In one or more embodiments of the invention, the hypervisor may also inventory services during execution of the services to obtain service migration information directly from the services or from processes monitoring the services on each individual VE. Alternatively, in one or more embodiments of the invention, the service migration information may be pushed by the service manager to the hypervisor during the execution of the aforementioned boot-up sequence or shortly thereafter. In this case, the service manager may be augmented to store extended service attributes and then push the extended service attributes to the hypervisor during boot-up or during migration. The hypervisor may obtain information such as which services are executing in each VE, which OSes are supported by each service (see Example 1 below), etc. Further examples of extended service attributes and service migration information obtained by the hypervisor are given below (see e.g., Examples 1-6 below).

In one or more embodiments of the invention, the hypervisor is configured to store the extended service attributes in persistent storage. That is, the service information stored by the hypervisor is persistent information that remains on the physical hardware even after the system is shutdown, and is not lost when the system is restarted, regardless of whether any OS is running on the host.

Continuing with FIG. 2, upon obtaining extended service attributes for each executing service on the host system, the hypervisor stores the extended service attributes in service profiles for each service (ST208). The service profiles may be any type of data structure stored in the service module of the hypervisor. In one or more embodiments of the invention, the hypervisor may simulate service activities to determine additional service attributes that are not obtainable from the service manager or from existing knowledge of the hypervisor (ST210). For example, the hypervisor may include a background process that simulates activities of certain services while the services are executing in a VE. The simulation may result in additional information that they hypervisor stores in service profiles or in the rules engine. Finally, the hypervisor may obtain, determine, and/or store rules for each service in the rules engine (ST212). Rules may be obtained, for example, from the service manager in the primary VE. Specifically, the hypervisor may query the service manager to obtain service rules, or the service manager may push the rules to the rules engine. Alternatively, rules may be determined during the service simulation in ST210.

The following examples illustrate some of the extended service attributes that may be obtained and stored in the service module and/or rules engine of the hypervisor in one or more embodiments of the invention. Such extended service attributes are accessed by the hypervisor at the time of migration to determine the steps necessary for moving the service. The following sample extended service attributes are for a hypothetical service. The format for the extended service attributes is the extended service attribute name/description, followed by the relevant data or reference to a location of where the data associated with the attributes may be found.

EXAMPLE 1

Supported Operating systems={Solaris_10_64, Solaris_11_64, Microsoft_Windows7_32}

As shown in Example 1, one of the extended service attributes that the hypervisor may need to be made aware of is a list of all supported host operating systems for the hypothetical service. In the above example, the hypothetical service supports three OSes, including a specific version of the Windows® OS and two different versions of the Solaris™ OS.

EXAMPLE 2

Location for OS installers={/usr/local/applications/DHCP, /usr/local/applications/DHCP, C:\Windows\Application\DHCP}

As shown in Example 2, in addition to the supported OSes, the hypervisor also obtains the corresponding location of the installers for each supported host operating system.

EXAMPLE 3

Service Install Scripts={/usr/local/applications/DHCP/install/silent, /usr/local/applications/DHCP/install/silent, C:\Windows\Application\DHCP\install\silent}

Example 3 shows service installation scripts supplied to the installer to perform automatic installation. This information may be created or derived from a previous installation of the service. The profile contains scripts and commands that may be executed to automatically install the service. This information may also be used to configure a particular VE to support the service.

EXAMPLE 4

Type Of Service={Installable=T/F, Relocatable=T/F, Scalable=T/F HA=T/F}

In one or more embodiments of the invention, the hypervisor also obtains the type of service. Example 4 shows that there are three types of services: installable, relocatable, and scalable. Installable defines the service as one that may be installed in an additional VE without any restrictions. Relocatable means that the service may be relocated from an existing VE to a new VE while requiring decommissioning on the old VE. Scalable means that the service may be set up in additional VE(s) to allow greater performance (i.e., the service may grow across VEs). Once a service is installed within a physical machine, it is no longer Installable within that physical machine. The service is then either be Relocatable or Scalable to other VEs within the physical system. A service generally cannot be Relocatable and Scalable at the same time (these are mutually exclusive properties). Exceptions to this rule are HA services (e.g., Oracle™ RAC node service), which are engineered with change in mind and therefore support relocation and scaling.

EXAMPLE 5

Service Relocation Profile=/usr/local/applications/DHCP/reloc/silent, /usr/local/applications/DHCP/reloc/silent, C:\Windows\Application\DHCP\reloc\silent}.

Along with the service type, the hypervisor may also obtain information required to automatically relocate the service, as shown in Example 5 above. For example, the above extended attributes specify how the existing service data is captured, how the existing service is decommissioned, and how the new service is started to replace the old service. For example, the old service may be brought down for a period of time while the new service is initiated. Alternatively, in one or more embodiments of the invention, the new service may be started using a live snapshot of the old service data while the old service is still running. In this case, when the new service has started, a dynamic synchronization with the old service is performed before decommissioning the old service. The service profile stored in the service module contains scripts and commands that are executed to automatically relocate the service.

EXAMPLE 6

Service Scalability Profile={/usr/local/applications/DHCP/reloc/silent, /usr/local/applications/DHCP/reloc/silent, C:\Windows\Application\DHCP\reloc\ silent Example 6 shows another extended service attribute that includes information on how to augment the service on a new VE. In this scenario, the new service runs simultaneously with the old service. Both services are set up to collaborate on managing their contracts (either by round robin assignment or otherwise). Accordingly, in one or more embodiments of the invention, the service profile contains scripts and commands that execute to automatically scale the service.

Those skilled in the art will appreciate that the aforementioned extended service attributes may be obtained by the hypervisor at various times during boot-up and/or during migration and stored by the hypervisor in persistent storage. Further, those skilled in the art will appreciate that some of the aforementioned extended service attributes may be stored as executable rules in the rules engine of the hypervisor, rather than in the service profiles of the service module. For example, the extended service attribute "Type of Service" may be stored as a rule which may be executed by the hypervisor during migration.

Figure 3:
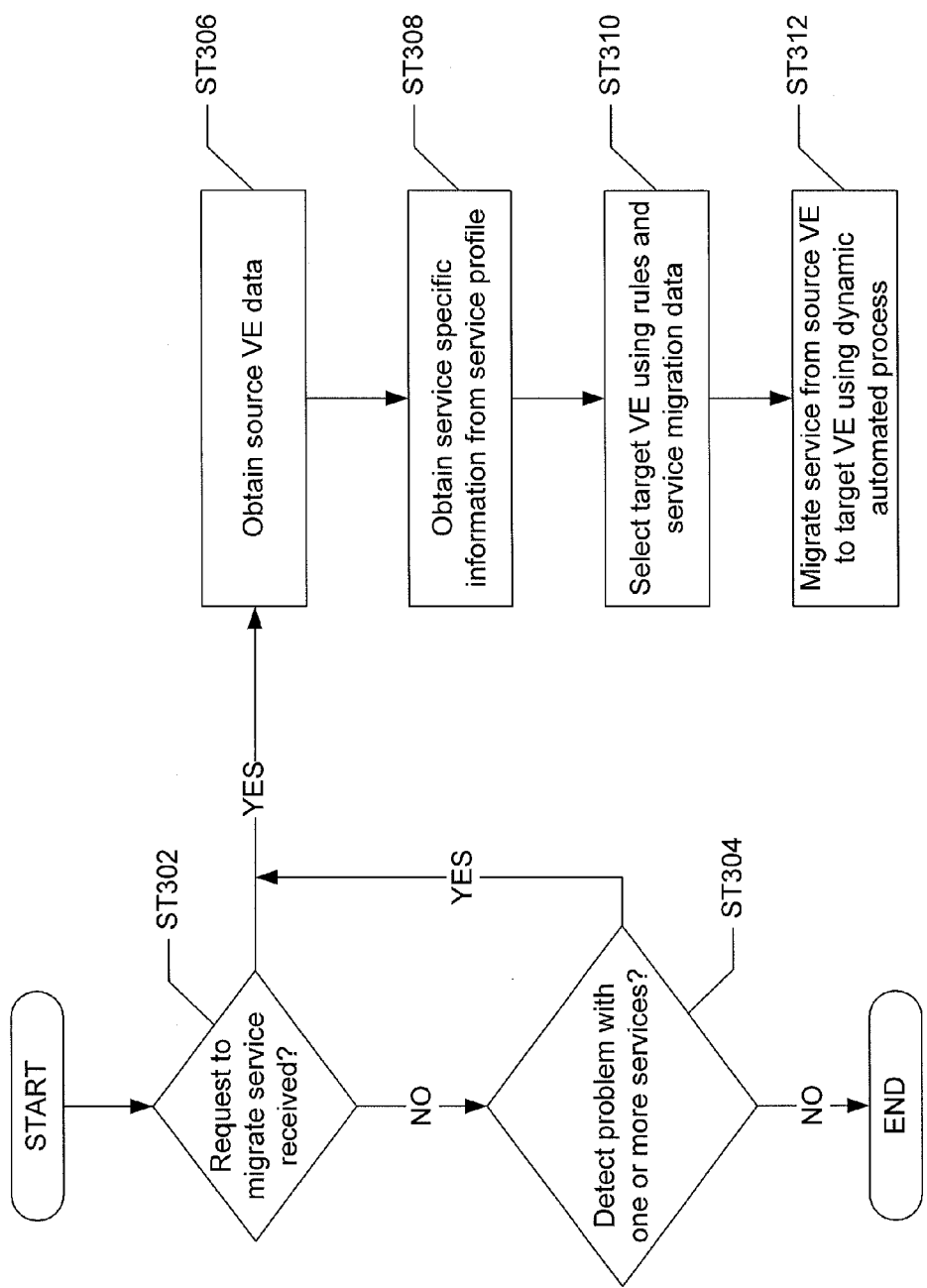

FIG. 3 shows a flow chart for the process of service migration in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Initially, a determination is made as to whether a request to migrate a service has been received by the hypervisor (ST302). There may be several reasons for migration of services. For example, a service may be migrated from one OS to another because the source OS is getting slow or old and needs to be updated with new versions of software or load-balancing of services across VEs needs to be performed. A service may also be migrated in response to demand, in which case new instances of the service may be instantiated on multiple VEs. In such cases, a request to migrate a particular service or set of services from a source VE to a target VE may be sent by a system administrator or from the service manager to the hypervisor. Alternatively, services may be migrated for security reasons. If there is a security violation or security breach in one VE, the system may need to migrate services to another VE. In this case, the hypervisor acts as a system administrator and manages the migration of services from the vulnerable VE to one or more target VEs. Still further, in one or more embodiments of the invention, a request to migrate a service may be received by the hypervisor when the service manager notices that a service trigger has been fired. As described above, a trigger is a logical relation among service attributes that causes the service monitor to request a service relocation from the primary domain.

If no request to migrate a service is received, then a second determination is made regarding whether there is a problem detected with one or more services (ST304). For example, services may fail, display a warning message, or may exhibit problems while running on the source VE. The service manager may, in this case, alert the hypervisor that a service is not executing properly or has displayed an error message or a failure of some other type. If no service problems are detected, and if no requests for migration are received, then the process ends. Those skilled in the art will appreciate that the service manager in the primary VE may monitor the current state of services on each VE executing in the host to determine whether any service problems exist. When a service problem arises that the service manager cannot solve on its own, the service manager escalates the issue to the hypervisor.

When either a service migration request is received or a problem with a service is detected, the hypervisor takes over control of the service from the service manager and begins a service migration/redeployment process. First, the hypervisor may obtain source VE data (ST306). Specifically, the hypervisor may query the VE manager in the primary VE to obtain data about the source VE on which the service to be migrated is currently executing. Source VE data may include determining how much physical memory or CPU power the source VE is occupying, which OS is running on the source VE, whether the source VE is executing updated versions of software for the service, the disk footprint of the source VE, or any other suitable source VE information. Those skilled in the art will appreciate that the source VE data may be pushed to the hypervisor by the VE manager during boot-up or may be obtained after a migration request is received. Also, the source VE data may be stored in the primary VE or may be stored in the hypervisor itself.

Next, the hypervisor obtains service migration information from the service profile stored as persistent data in the service module (ST308). In one or more embodiments of the invention, the hypervisor accesses information stored in the service profile of each service in order to determine the attributes of the service that dictate how the service must be migrated. That is, the hypervisor uses the information collected about each service during boot-up from the service manager and during execution of the service to determine how to migrate a service from one VE to another. At this stage, the hypervisor selects a target VE onto which the service is moved (ST310). In one or more embodiments, the target VE may already exist on the host system, in which case the hypervisor may migrate services to the existing target VE. The hypervisor may also decide to instantiate a new target VE based on pre-existing resource allocation rules stored in the rules engine, or directly through user directives from the Service Manager to the service module.

In one or more embodiments of the invention, the target VE is selected based on both service requirements and source VE requirements. The hypervisor assesses the hardware requirements of the source VE, and selects a target VE based on whether the service requires more, less, or similar hardware resources. In addition, the hypervisor may access the service dependency rules stored in the rules engine to determine whether other services (on which the service to be migrated depends upon) are available or already executing within a potential target VE. In one or more embodiments of the invention, a new target VE may be instantiated by cloning the source VE. In one or more embodiments of the invention, a new target VE may be instantiated by cloning the source VE.

In one or more embodiments of the invention, whether the hypervisor decides to instantiate a new target VE or use an existing VE depends on both the source VE information and the service specific information obtained by the hypervisor. If no existing VE matches the parameters of the source VE, then a new target VE may be instantiated. For example, if the service requires a certain amount of memory to execute, and none of the existing VEs have that amount of memory available, then the hypervisor may instantiate a new target VE for the service. Thus, target VEs may be selected based on source VE parameters, service migration information, and rules stored in the rules engine of the hypervisor.

Finally, the service is migrated from the source VE to the selected target VE by the hypervisor using a dynamic automated process (ST312). Details on how the migration is performed by the hypervisor are provided in FIG. 4 below.

Figure 4:
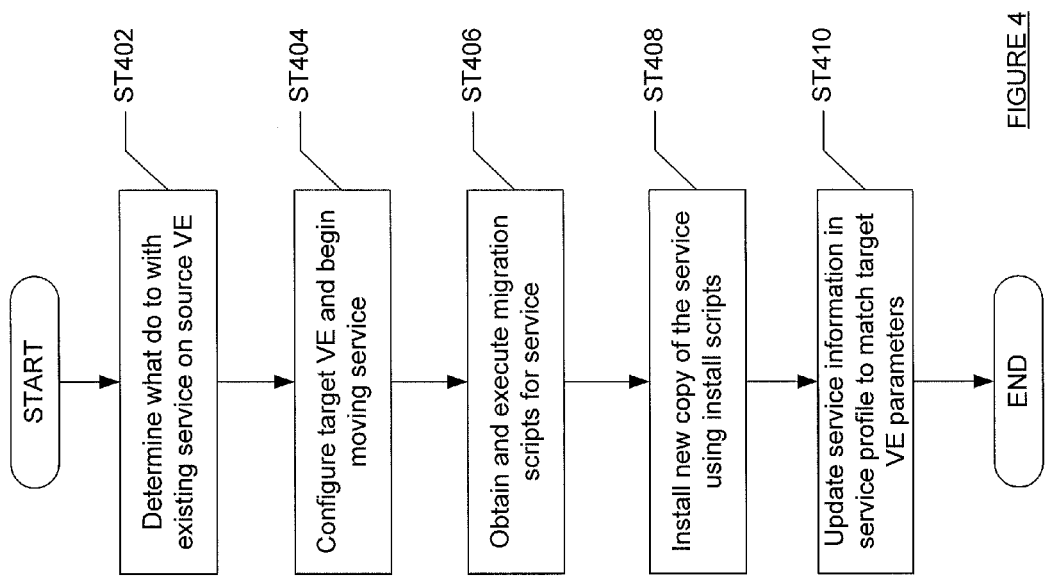

FIG. 4 shows a flow chart that expands on ST312 in FIG. 3 in accordance with one or more embodiments of the invention. Specifically, FIG. 4 details the steps involved for migration of a service by the hypervisor. While the various steps in these flowcharts are presented and described sequentially, one of ordinary skill will appreciate that some or all of the steps may be executed in different orders, may be combined or omitted, and some or all of the steps may be executed in parallel.

Initially, the hypervisor must decide what to do with the currently executing instance of the service on the source VE (ST402). In one embodiment of the invention, the service may be stopped (decommissioned) on the source VE and reinstantiated on the target VE. Alternatively, in another embodiment of the invention, the hypervisor may instantiate the service on the target VE first, so that there is no downtime of the service during migration. Those skilled in the art would appreciate that whether a service is stopped first or does not experience any downtime depends largely in part on the sophistication level of the service and the importance of the service to users. For example, a service such as e-mail or telephone may be able to afford some downtime, but a service associated with security may be instantiated on the target VE first, without stopping the service on the source VE. Alternatively, some services may be scalable (i.e., able to grow across VEs) (see e.g., Example 4 above). In this case, the service need not be stopped on the source VE before instantiation on the target VE.

Continuing with FIG. 4, when the target VE is started, the hypervisor configures the target VE to support the service (ST404). In one or more embodiments of the invention, the hypervisor may configure the target VE using details provided in the extended service attributes stored in the service profile of the service to be migrated. For example, if the service is a critical service, the target VE may be configured in an identical manner to the source VE. In one or more embodiments of the invention, the hypervisor begins to relocate the service based on the "rank" of the service. The service rank is part of the basic service information for each service that may be stored in the service manager and obtained by the hypervisor. The service rank describes whether the service is low, medium, or critical. A low service rank means that downtime of the service is acceptable and may include the stopping of the service on one VE and then installing, relocating or scaling of the service on another VE. A medium rank indicates that minimal downtime is acceptable. The service to be installed, relocated or scaled should be configured on a target VE and brought up in parallel to decommissioning of the service on the source VE. A service rank of critical indicates that services must support high availability (HA) in order to be installed on another VE, relocated to another VE or scaled to another VE.

Continuing with moving the service over to the target VE, the hypervisor obtains and executes migration scripts for the service (ST406). Migration scripts are scripts for automating the migration process. References to the migration scripts may be stored in the service profile of each service in the hypervisor. For example, the migration scripts may execute the steps of decommissioning the service on the source VE, scaling the service to the target VE, etc. In one or more embodiments of the invention, migration scripts include a new Dynamic Service Provisioning Protocol (DSPP) to handle the movement of services between VEs. The DSPP protocol may be manually invoked to install, relocate, or scale a service. Services can be automatically installed, relocated, or scaled based on rules stored in the rules engine in the hypervisor.

Those skilled in the art will appreciate that moving a service to the target VE may be performed in multiple ways. For example, depending on the service attributes and rules, user demand, and other factors, the service may be scaled to the target VE. In one or more embodiments of the invention, based on pre-defined service rules, the hypervisor may scale a service in one of two ways. The first method involves increasing the resources available to the source VE. For example, increased CPU power, increased memory, or increased disk space. As the hypervisor communicates directly with the physical hardware, the hypervisor is able to provide increased hardware resources to the source VE and oversee the scaling of the service in this manner. The second form of scaling would be bringing up an identical target VE (e.g., a clone of the source VE), setting up the service on the second VE, and sharing the workload between the source and target VEs. In this case, installing the service on the second VE requires access to a scalable service profile extended attribute (see Example 6 above) for the service to be scaled.

After it is determined how the service is to be relocated and/or scaled and migration scripts are executed, the service is installed on the target VE using install scripts (ST408). Install scripts automate the process of installing the service on the target VE. References to install scripts may also be stored in the service profile of each service (see Example 3 above). The service install scripts execute to boot-up the service on the target VE, initialize and configure the service on the target VE, and resolve any configuration or initialization errors to ensure that the service is up and running on the target VE. Once the service is installed successfully in the target VE chosen by the hypervisor, the hypervisor updates service information in the service profile of the migrated service (ST410). Specifically, the service profile of the migrated service is updated to reflect the parameters of the target VE. The parameters of the target VE may include the location of the target VE, the target VE memory footprint, the target VE OS, etc.

The following example illustrates the process of migrating a hypothetical DHCP service with the following basic service information:
Service Name: DHCP
Status: running
Rank: LOW
Trigger: cpu In the example above, the service manager running on the primary VE monitors the DHCP service, which may be executing on the primary VE or another secondary VE. When a trigger is reached, the primary VE (through the service manager) communicates with the hypervisor and requests assistance. For example, the service manager may indicate to the hypervisor that the DHCP service may need to be migrated.

The hypervisor then queries the rules engine to determine the rules defining the DHCP service. At this point, the hypervisor, based on the pre-defined rules, determines whether installing, relocating, or scaling is relevant for a service with a LOW rank and high CPU usage. An example rule for the DHCP service is as follows:
SN=DHCP, Supported_OS=sol10u11, Rank=low, Trigger=cpu, action="Increase cpu", "Wait"
SN=DHCP, Supported_OS=sol10u11, Rank=low, Trigger=cpu, action="scale"
According to the rule, the hypervisor then increases the CPU usage allocated to the source VE and waits for another trigger from the primary VE. Thus, the hypervisor is able to provide more power to the service to enable the service to execute faster in order to attempt to resolve any issues with the service on the source VE. If a second trigger is fired then the action of increasing the CPU usage has not fixed the issue. At this stage, the hypervisor may determine whether additional rules apply to the service, when a second trigger is fired. If other rules exist for the service, then those rules are executed by the hypervisor. For example, a second rule may call for the service to be scaled. In this case, the hypervisor begins scaling the service. Alternatively, the next rule may call for the service to be migrated to a target VE which has enough CPU usage allotted to the target VE. According to embodiments of the invention, the hypervisor then selects a target VE, accesses scripts for automating the migration and installation process, and finally updates the service profile of the DHCP service to reflect target VE parameters, once the service is successfully installed and executing on the target VE according to service attributes and rules.

To illustrate another embodiment of the invention, consider the scenario in which a service is a critical high availability (HA) service that needs to be scaled to a target VE. For example, the service may be a node in database cluster. In this case, the service rank is critical, and the target VE may be created as a clone of the source VE. In one or more embodiments of the invention, the hypervisor may instantiate and configure the target VE to have identical CPU, memory, and disk requirements as the source VE. Additionally, the hypervisor may grow the service onto the target VE using the scalable extended service attributes stored in the service module of the hypervisor. The hypervisor may also check the dependency rules and bring up services on which the node cluster is dependent first, and then install the critical service on the target VE. The workload may then be shared across the two instances of the node cluster service, executing on two distinct VEs on the same physical hardware set.

Embodiments of the invention provide the hypervisor with capability to oversee the management of system services across multiple VEs. This allows for greatly simplified implementation of service migration because the hypervisor is already aware of where within the virtualized systems executing on the same physical hardware services may be permitted to migrate. Specifically, because the hypervisor communicates directly with the physical hardware, the hypervisor is in a unique position to "see" the entire system and determine which target VE would be best suited for a service which needs to be migrated. Thus, embodiments of the invention allow for the physical hardware, VEs on the physical hardware, and the underlying hypervisor to be managed as a virtual cloud of resources in which services reside and are managed. This removes the restriction of services being bound or tightly coupled to specific operating system instances and permits more automated deployment and redistribution of services by using the hypervisor's existing knowledge of virtualized systems. This allows for services to be migrated across/between virtualized environments executing within the same physical hardware in a lightweight manner.

Figure 5:
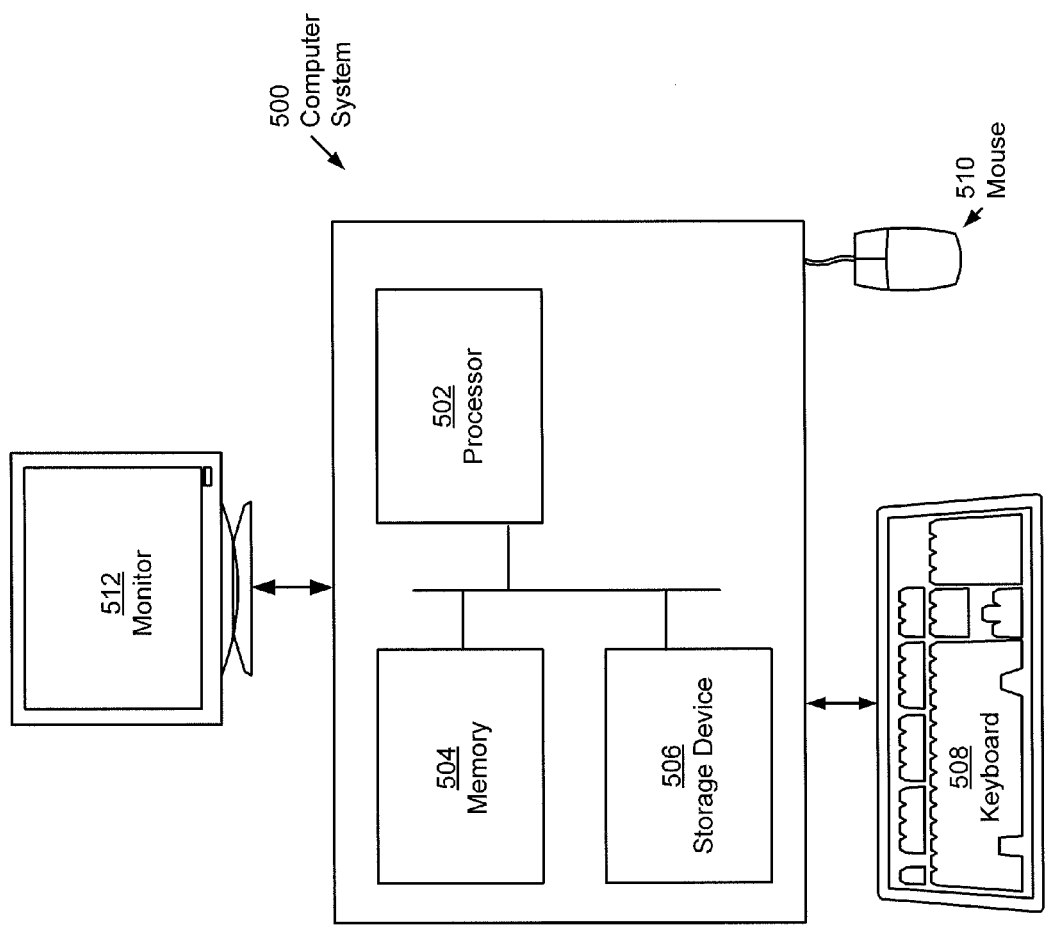
FIG. 5 shows a computing device in accordance with one or more embodiments of the invention.

Embodiments of the invention may be implemented on virtually any type of computer regardless of the platform being used. For example, as shown in FIG. 5, a computer system (500) includes one or more processor(s) (502) such as a central processing unit (CPU) or other hardware processor(s), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code may be used to perform embodiments of the invention. The software instructions in the form of computer readable code may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for migrating services, comprising:
an execution environment, comprising:
a primary virtual environment (VE) executing a primary operating system and comprising a service manager and a VE manager, and
a first secondary VE executing a guest operating system, wherein a plurality of services execute on each of the primary VE and the first secondary VE; and
a set of physical hardware, wherein the primary VE and the first secondary VE execute on the set of physical hardware;
wherein the execution environment comprises a hypervisor operatively connected to the set of physical hardware, the hypervisor comprising a service module for storing a plurality of service profiles comprising extended service attributes of each of the plurality of services executing on the primary VE and the first secondary VE, the hypervisor being configured to:
receive a request to migrate one of the plurality of services executing on a source VE, wherein the source VE is the first secondary VE;
obtain source VE data by querying the service manager, wherein source VE data comprises hardware requirements of the source VE;
obtain extended service attributes associated with the one of the plurality services to be migrated;
select a target VE for migration of the service, wherein the target VE is selected based on the source VE data and the extended service attributes of the one of the plurality of services, wherein the target VE conforms to a requirement of the one of the plurality of services to be migrated;
migrate the one of the plurality of services using a dynamic automated process comprising configuring the target VE and installing the service on the target VE using a plurality of install scripts that execute on the target VE; and
simulate activities of the one of the plurality of services to obtain dependency rules and additional extended service attributes associated with the one of the plurality of services.

2. The system of claim 1, wherein the hypervisor further comprises a rules engine for storing dependency rules associated with each service.

3. The system of claim 2, wherein selecting the target VE comprises:
locating existing VEs on the execution environment;
accessing dependency rules associated with the one of the plurality of services;
determining whether additional services on which the one of the plurality of services depends execute on existing VEs; and
selecting the target VE as one of the existing VEs which matches the dependency rules of the one of the plurality of services.

4. The system of claim 1, wherein migrating the one of the plurality of services comprises relocating the one of the plurality of services to the target VE.

5. The system of claim 1, wherein migrating the one of the plurality of services comprises scaling the one of the plurality of services to the target VE by:
bringing up a second secondary VE as the target VE, wherein the second secondary VE is a clone of the source VE;
setting up the one of the plurality of services on the target VE, wherein the one of the plurality of services executes on both the target VE and the source VE; and
sharing a workload of the one of the plurality of services across both the target VE and the source VE.

6. The system of claim 5, wherein the one of the plurality of services is a critical service.

7. The system of claim 1, wherein the one of the plurality of services is migrated based on a rank of the one of the plurality of services.

8. The system of claim 1, wherein the set of physical hardware comprises at least one selected from a group consisting of a plurality of processors, persistent storage devices, hardware devices, and physical memory.

9. The system of claim 1, wherein the source VE data comprises source VE hardware requirements, source VE memory footprints, and operating systems supported by the source VE.

10. The system of claim 1, wherein selecting the target VE comprises:
determining that existing VEs on the execution environment do not match source VE data and requirements of the one of the plurality of services; and
instantiating a second secondary VE as the target VE.

11. The system of claim 10, wherein the second secondary VE is a clone of the source VE.

12. The system of claim 1, wherein the extended service attributes are obtained by querying the service manager in the primary VE.

13. The system of claim 1, wherein the service manager in the primary VE is augmented to store the extended service attributes for each of the plurality of services.

14. The system of claim 1, wherein a reference to location of the plurality of install scripts is stored in the service profile of the one of the plurality of services.

15. The system of claim 1, wherein extended service attributes comprise at least one selected from a group consisting of dependency rules associated with each service, a type of each service, scalability attributes of each service, location of migration and install scripts for each service, relocatable attributes of each service, and operating systems supported by each service.

16. The system of claim 1, wherein the one of the plurality of services is migrated using a Dynamic Service Provisioning Protocol (DSPP).

17. A method for migrating a service by a hypervisor, comprising:
receiving a request to migrate one of a plurality of services executing on an execution environment,
wherein the execution environment comprises a primary virtual environment (VE) executing a primary operating system and a first secondary VE executing a guest operating system and executes the primary VE and the first secondary VE; and
wherein the one of the plurality of services to be migrated executes on a source VE and the source VE is the first secondary VE;
obtaining source VE data by querying a service manager executing on the execution environment, wherein source VE data comprises hardware requirements of the source VE;
obtaining extended service attributes associated with the one of the plurality of services to be migrated;
selecting, by the hypervisor, a target VE for migration of the service, wherein the target VE is selected based on the source VE data and the extended service attributes of the one of the plurality of services, wherein the target VE conforms to the requirements of the one of the plurality of services to be migrated;
migrating, by the hypervisor, the one of the plurality of services using a dynamic automated process comprising configuring the target VE and installing the service on the target VE using a plurality of install scripts that execute on the target VE; and
simulating activities of the one of the plurality of services to obtain dependency rules and additional extended service attributes associated with the one of the plurality of services.

18. The method of claim 17, wherein obtaining extended service attributes comprises one selected from a group consisting of pulling the extended service attributes from the service manager and pushing the extended service attributes from the service manager to the hypervisor.

19. A non-transitory computer readable medium comprising software instructions, that when executed, are configured to perform a method for migrating a service by a hypervisor, the method comprising:
receiving a request to migrate one of a plurality of services executing on an execution environment,
wherein the execution environment comprises a primary virtual environment (VE) executing a primary operating system and a first secondary VE executing a guest operating system and executes the primary VE and the first secondary VE; and
wherein the one of the plurality of services to be migrated executes on a source VE and the source VE is the first secondary VE;
obtaining source VE data by querying a service manager executing on the execution environment, wherein source VE data comprises hardware requirements of the source VE;
obtaining extended service attributes associated with the one of the plurality of services to be migrated;
selecting, by the hypervisor, a target VE for migration of the service, wherein the target VE is selected based on the source VE data and the extended service attributes of the one of the plurality of services, wherein the target VE conforms to the requirements of the one of the plurality of services to be migrated;
migrating, by the hypervisor, the one of the plurality of services using a dynamic automated process comprising configuring the target VE and installing the service on the target VE using a plurality of install scripts that execute on the target VE; and
simulating activities of the one of the plurality of services to obtain dependency rules and additional extended service attributes associated with the one of the plurality of services.

* * * * *